United States Patent [19]
Kahn et al.

[11] 3,757,317
[45] Sept. 4, 1973

[54] LIQUID LEVEL SENSING AND CONTROL SYSTEM

[75] Inventors: Alexander Kahn, Massagegua; Charles Kahn, St. James; Warren Johannesen, West Islip, all of N.Y.

[73] Assignee: U.S. Dynamics Corporation, Amityville, N.Y.

[22] Filed: Sept. 15, 1971

[21] Appl. No.: 180,613

[52] U.S. Cl. .............................. 340/244 R, 137/392
[51] Int. Cl. ............................................ G08b 21/00
[58] Field of Search .................. 340/244 R, 244 C, 340/239 R; 73/295, 204; 137/386, 391, 392; 417/63, 211.5

[56] References Cited
UNITED STATES PATENTS

| 3,229,167 | 1/1966 | Goble | 340/244 R |
|---|---|---|---|
| 3,181,557 | 5/1965 | Lannan, Jr. | 137/391 |
| 3,408,941 | 11/1968 | Sorensen | 137/392 X |
| 3,584,643 | 6/1971 | Burke | 340/244 C X |
| 3,525,090 | 8/1970 | Raddatz | 340/244 C |

*Primary Examiner*—John W. Caldwell
*Assistant Examiner*—Daniel Myer
*Attorney*—James A. Eisenman et al.

[57] ABSTRACT

Fluid sensing and control apparatus using solid state devices and capable of fluid sensing at spaced points to furnish output control signals to maintain fluid conditions within predefined limits. A feedback circuit between sensors is provided to minimize power consumption in quiescent periods and timed alarm-actuating signals are generated in the event control functions are not achieved.

6 Claims, 2 Drawing Figures

LIQUID LEVEL SENSING AND CONTROL SYSTEM

BACKGROUND OF THE INVENTION

The invention relates to fluid sensing and control and is particularly applicable to gas-liquid interface environments in which the interface position is to be sensed and controlled within predefined ranges.

The problems of fluid sensing and the energization of control or alarm systems in response thereto have been approached in a variety of ways as technology advances. Broadly, electrically-energized solid-state sensors working in solid state circuits have eliminated the need for moving parts in such systems and have increased overall reliability and work life. More specifically, however, problems of control of fluid interfaces over a predetermined distance, power consumption, and protection of sensitive elements from damage, have not been successfully solved for many environments.

Accordingly, it is an object of the present invention to provide an improved fluid sensing and control system which achieves a high degree of reliability at relatively low cost.

It is a further object of the invention to provide a versatile fluid interface sensing and control system which is free of electrical currents flowing the sensed fluids, which consumes little electrical power, particularly under quiescent conditions and which affords protection for sensitive elements against, for example, short circuits, surges in source voltage or the like.

BRIEF SUMMARY OF THE INVENTION

In accordance with the invention, an array of two or more sensors, which can take the form of positive temperature coefficient thermistors, are disposed at different levels related to the extremes of liquid level desired to be sensed and controlled. The system is arranged so that only one sensor remains energized under quiescent conditions for continuing surveillance, but with all sensors interconnected so that a response by the initially energized sensor conditions another for operation, as well as initiating a desired control function, such for example as a pump. A feedback control loop enables the newly conditioned sensor to take over con-trol of the output so the pump continues to operate until a liquid level differing from that of the first sensor is achieved. A timing circuit powered independently of the power circuit can be coupled to the initially energized sensor to monitor the liquid level at the point. A second output, such as an alarm or other control function, is initiated by the timing circuit in the event the basic liquid level control might, for any reason, fail to operate properly.

DETAILED DESCRIPTION OF A PREFERRED EMBODIMENT

Figure 1:
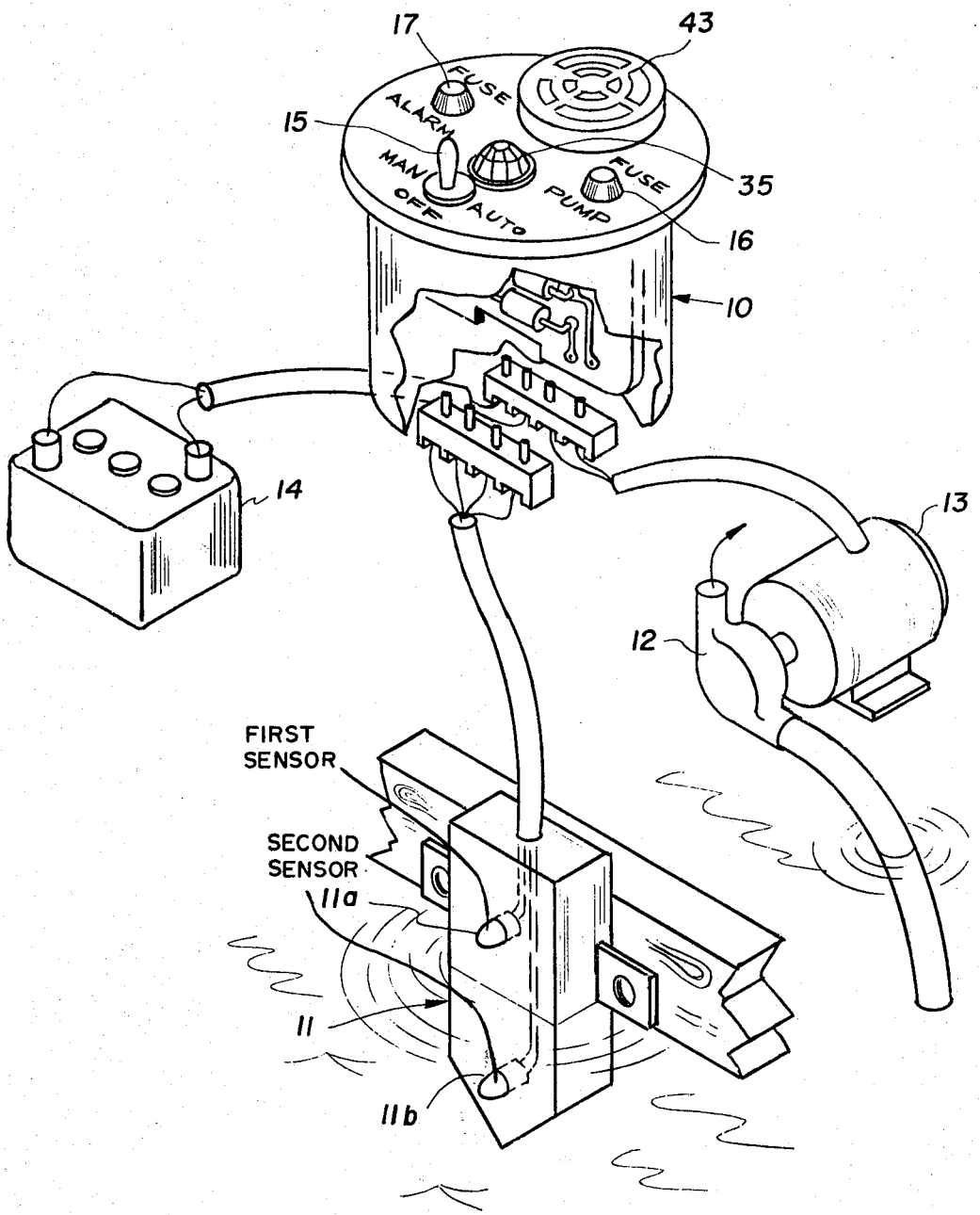
FIG. 1 is a diagrammatic view in perspective of a level sensing and control system for automatically maintaining the liquid level in the bilge of a boat within predetermined extremes.
Figure 2:
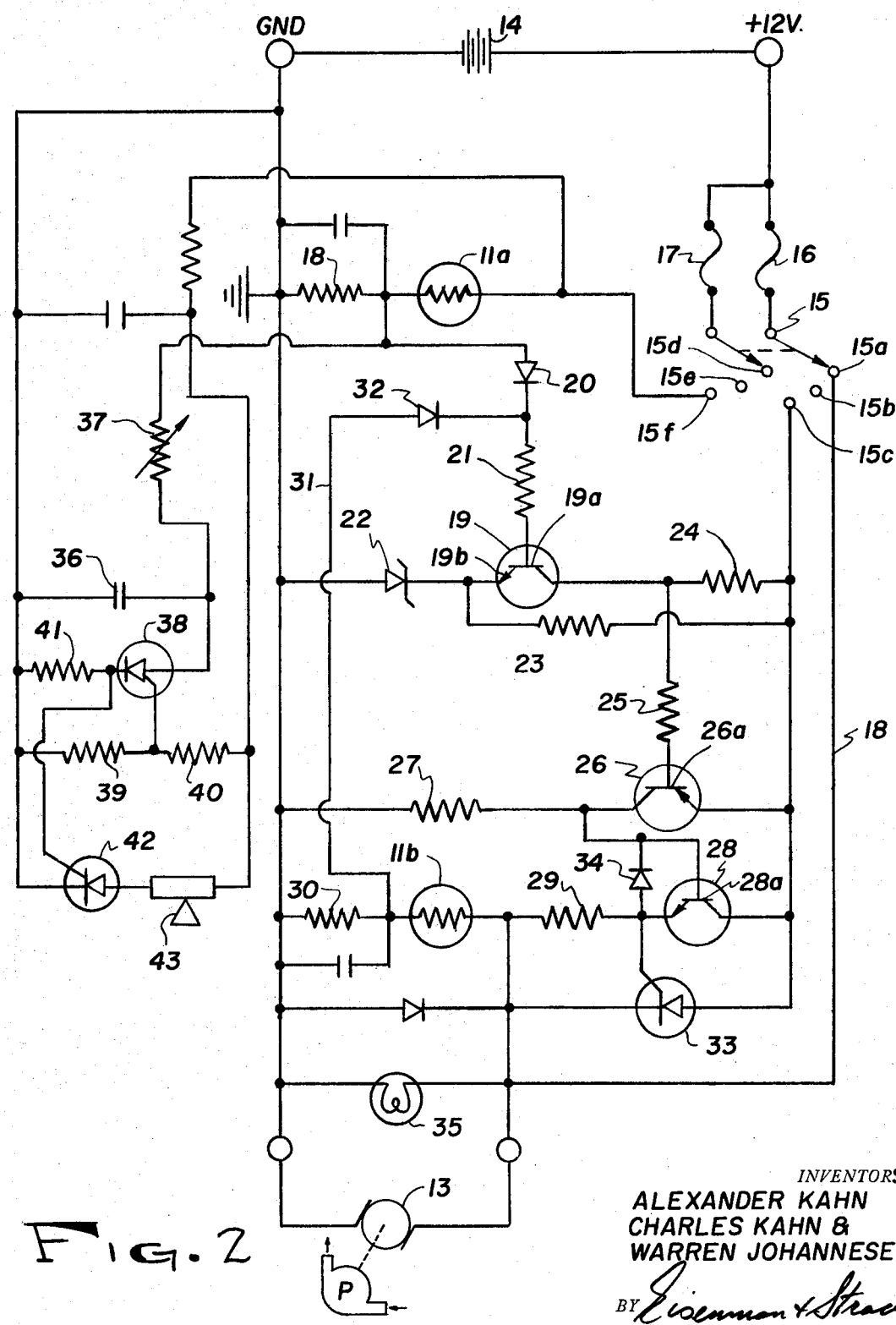
FIG. 2 is a schematic diagram of the electrical circuit of the system of FIG. 1.

Referring to the drawings, the invention is illustrated as embodied in a sensing and control system for maintaining the bilge water in boats between predetermined extreme levels. As shown in FIG. 1, the system includes a central control assembly 10, preferably disposed on the bridge of the boat, a sensing assembly 11 including a pair of vertically spaced apart sensors 11a and 11b, in the form of positive temperature coefficient thermistors, a bilge pump 12 operated by an electric motor 13, and a power source 14 of the boat in the form of a storage battery.

The control assembly includes a manually operated switch 15, in the form of two ganged three-terminal switches, working in two parallel power circuits, including fuses 16 and 17 respectively. The power circuit including the fuse 16 feeds the motor 13 for the bilge pump 12, and includes a manual terminal 15a by means of which power is fed directly to the motor, an "off" terminal 15b, and an automatic terminal 15c through which power is delivered both to the motor 13 and the control circuitry of the level-sensing system. The power circuit including the fuse 17 includes a dummy "off" terminal 15d, and "off" terminal 15e, and an automatic terminal 15f, which feeds a timed alarm circuit presently to be described, and the upper sensing thermistor 11a.

Assuming for purposes of explanation that the switch 15 is thrown to its automatic position with power introduced into terminals 15c and 15f, and further assuming that the water level in the bilge is between the sensing thermistors 11a and 11b, with the water rising and the pump 12 inactive, no power will be flowing through the power circuit including the fuse 16 and the terminal 15c. A very small amount of the current will, however, flow through the upper sensing thermistor 11a and the resistor 18 to ground, generating heat within the sensor. The sensor 11a being in air, heat dissipation will be limited and, therefore, relatively high resistance will be reflected in the circuit. In such quiescent state, the sensor 11a is conditioned for response, which occurs when the water level rises to envelop it, resulting in a fast dissipation of heat, a consequent lowering of temperature, and therefore a reduced resistance. The voltage between the sensor 11a and resistor 18 will therefore rise, and increased voltage will appear on the base electrode 19a of a high-gain NPN transistor 19 through a circuit including a diode 20 and a resistor 21. A voltage reference diode 22 is connected between the emitter 19b and ground, and line voltage is established between the diode 22 and the emitter through a high resistance 23. Thus the transistor will saturate rapidly as base voltage exceeds the reference voltage. The transistor 19 then fires with the voltage drop across the load resistor 24 being impressed through a resistance 25 on the base electrode 26a of a PNP transistor 26, connected between the line voltage and ground through a load resistor 27. As a result, a voltage will be impressed on the base electrode 28a of an NPN power type "pass" transistor 28, which is thereby rendered conducting to pass drive current to the motor 13 through a low value resistor 29.

The bilge pump 12 will then begin operation and simultaneously a voltage will be impressed across the lower sensing thermistor 11b and ground with the load current passing through a series resistor 30. The lower sensing thermistor is thus conditioned for subsequent operation, i.e. it will reflect a sharply raised resistance when the water level is lowered to a point exposing it to air. Meantime, however, being enveloped in water, it will reflect a relatively low resistance and the voltage drop across the resistor 30 will be fed through a feedback circuit including a conductor 31, a forwardly polarized diode 32, and the base resistor 21 to the base electrode 19a of the transistor 19. This positive feedback configuration clamps the transistor 19 in its "on" condition which in turn maintains the transistors 26 and 28 "on", thereby continuing energization of the bilge pump even though the water level subsequently drops below the upper sensing thermistor 11a, causing its resistance to increase sharply due to accumulated heat, which in turn causes the initiating voltage for the transistor 19 as developed across the resistor 18 to decay. The bilge water level will continue to lower until such time as the lower sensing thermistor 11a is exposed to air, at which time its resistance will increase to cause the feedback voltage in the conductor 31 to decay to a point at which the transistor 19 turns "off", which in turn turns off the transistors 26 and 28 to terminate the flow power to the pump motor 13.

In the event of a short circuit or other overload condition in the motor 13, resulting in a current demand which would normally burn out the power transistor 28, an increased voltage drop occurring across the resistor 29 will trigger a silicon-controlled rectifier 33 which will short out the collector emitter circuit of the power transistor 28 until the main fuse 16 blows. The power transistor 28 is further protected against voltage surges in the system by a protective diode 34 coupling the emitter circuit to ground through a resistor 27. An indicator light 35 across the motor terminals indicates to the operator when the motor circuit is energized. It will be observed, however, that the blowing of the main fuse to the motor does not disable the power circuit to the upper sensing thermistor 11a or to a second output of alarm circuit, including at its input end a timing capacitor 36 which will charge slowly through a resistor 37 when the upper sensing thermistor 11a is immersed in liquid. The rate of charging of the capacitor 36 is determined by the value of the resistor 37 which can, if desired, be made adjustable. The capacitor 36 is connected on its ungrounded side to the gate electrode of a programmable unijunction transistor 38, the anode of which is connected to a voltage divider including resistors 39 and 40 across the line. When the capacitor 36 charges to a voltage level determined by the voltage from the divider, the transistor 38 fires, discharging the capacitor 36 through the load resistor 41, and also triggering a silicon-controlled rectifier 42 connected in series with an audio alarm or other output device 43. The circuit to the alarm will continue closed with the alarm in action until such time as the manual switch 15 is actuated to turn it off. The time required for the alarm to be actuated once the sensing thermistor 11a has been enveloped by water, can be varied from a few seconds (normally the time required for the pump to begin lowering the water level) to a few minutes by changing the value of the resistor 37 in series with the charging capacitor 36.

While the invention has been described above having reference to a preferred embodiment thereof, it will be understood that it can take other forms and arrangements within the scope of the invention. Thus, for example, it can be readily adapted for various other applications, for sensing and controlling the high and/or low levels of a fluid in which there is an interface with another fluid having sufficiently differing heat-dissipation characteristics to achieve the desired swing in resistance values of the sensing thermistors. Also, it will be understood that the alarm circuit can be used to control other warning devices or to activate redundant controls or standby systems. The invention should not, therefore, be regarded as limited except as defined in the following claims:

What is claimed is:

1. Fluid sensing and control apparatus comprising at least first and second electrical resistance sensors spaced apart in the direction of fluid control, each sensor having an electrical impedance characteristic which varies with temperature, an electrical input power source and a controlled electrical power output, means to energize the first sensor continuously from the power source, circuit means to normally block the flow of electrical power to the second sensor, circuit means responsive to the changes of resistance due to the presence of the controlled fluid at the first sensor to initiate the power output, means responsive to the power output to energize the normally deenergized second sensor, feedback circuit means responsive to the energization of the second sensor to maintain the initiated power output in the absence of con-trolled fluid enveloping the first sensor, and circuit means responsive to change of resistance due to the absence of the controlled fluid at the second sensor to terminate the output power.

2. Apparatus according to claim 1 including timing circuit means responsive to the presence of controlled fluid at the first sensor for a predetermined time interval to furnish a second power output, said time interval being in excess of the time normally required for the controlled fluid to be cleared from the first sensor whereby the first and the second power output are sequentially derived with the second output affording an indication of failure of the first power output to change the fluid level.

3. Apparatus according to claim 1 including transistor switch means coupled to the first sensor to be actuated in the presence of the controlled fluid, and a power transistor responsive to the actuation of the transistor switch means to couple the power source to the output, said feedback circuit being connected between the second sensor and the transistor switch means to maintain the power transistor in operation while the controlled fluid envelops the second sensor.

4. Apparatus according to claim 3, the power source including a first power circuit for energizing the output and a parallel second power circuit for energizing at least the first of said sensors, a second output circuit responsive to the first sensor, and first and second overload protection means disposed respectively in the first and second power circuits, whereby the first and second output circuits can function independently.

5. Apparatus according to claim 4, said second output circuit including an alarm.

6. Apparatus according to claim 5, said second output circuit including a transistor switch to control the alarm, and a timing circuit to control the transistor switch.

* * * * *

UNITED STATES PATENT OFFICE
CERTIFICATE OF CORRECTION

Patent No. 3,757,317  Dated Sept. 4, 1973

Inventor(s) Alexander Kahn, Charles Kahn & Warren Johannesen

It is certified that error appears in the above-identified patent and that said Letters Patent are hereby corrected as shown below:

The address of Alexander Kahn should be changed from "Massagegua" to --Massapequa--.

Column 1, line 44, change "con-trol" to --control--.

" 1, " 49, before "point" change "the" to --that--.

" 2, " 20, after "terminal 15d," change "and" to --an--.

" 3, " 35, before "alarm" change "of" to --or--.

Signed and sealed this 12th day of March 1974.

(SEAL)
Attest:

EDWARD M. FLETCHER, JR.
Attesting Officer

C. MARSHALL DANN
Commissioner of Patents